M. W. POND.
Harness-Saddle Trees.
No. 143,381.            Patented September 30, 1873.
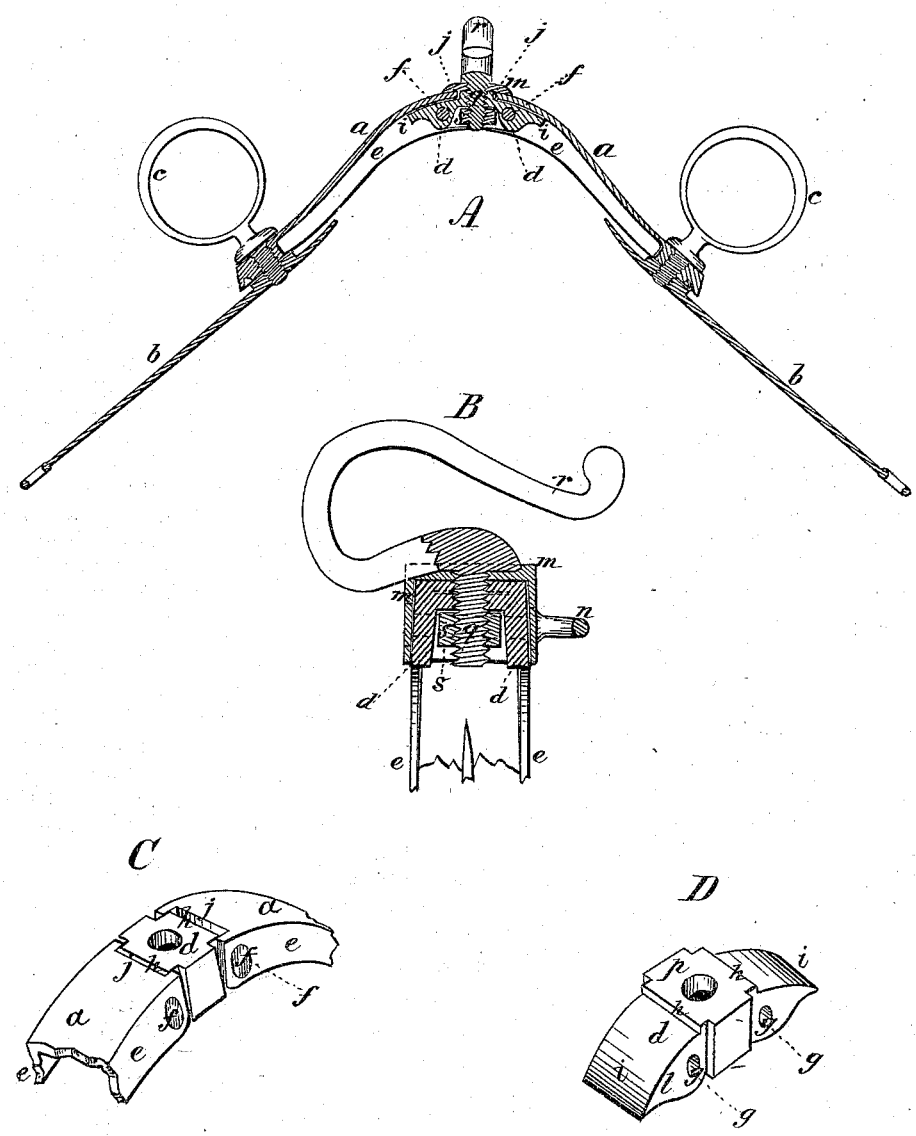
WITNESSES.          INVENTOR.
Chas. Wagner          Martin W. Pond,
J. H. Rutherford    By   Johnson and Johnson
                                      Attorneys.

UNITED STATES PATENT OFFICE.

MARTIN W. POND, OF ELYRIA, OHIO.

IMPROVEMENT IN HARNESS SADDLE-TREES.

Specification forming part of Letters Patent No. 143,381, dated September 30, 1873; application filed September 11, 1873.

*To all whom it may concern:*

Be it known that I, MARTIN W. POND, of Elyria, in the county of Lorain and State of Ohio, have invented new and useful Improvements in Self-Adjusting Harness Saddle-Trees, of which the following is a specification:

My invention relates to harness saddle-trees having a center joint for rendering the tree self-adjusting to the horse's back, such as that in a patent granted to me July 1, 1873, and in which a staple serves to secure the center cap to the yoke, form the loop for the back-strap, and the hinges for the yoke-joints, and upon which staple the flanges of the yoke have comparatively thin bearing, and, by their constant wearing upon the staple, are liable in time to cut off the staple or rivet ends of the joints. It is the object of my present improvement to render the yoke-joint durable by transferring the bearings from the yoke-flanges and staple to a separate fixed core-joint bearing and brace clamped between the flanges of the yoke, and crossing the joint thereof, whereby the joint-pins have a wide bearing independent of the flanges, and the connection of the parts rendered firm by the clamping of the cap and core bearing together by a screw-shank from the check-hook, while the position and construction of the joint-core bearing serves to limit the flexure of the joint.

In the accompanying drawings, A represents a vertical section of a a harness-tree embracing my invention; B, a similar cross-section taken at the joint; C, a view in perspective of the yoke-joint with the cap and check-hook removed; and D, a view in perspective of the separate core-joint bearings. The yoke $a$ is hinged in its center and connected to the pad-plates $b$ by angular rigid connections, through which the terrets $c$ pass to unite them. The bearings of the yoke-joints are formed in a metallic core, $d$, fitted between the side flanges $e$ of the yoke-sections $a$ for the reception of the joint-pins $f$, the ends of which are riveted fast in the flanges $e$ so that they cannot move therein, while they pass through and have about three-quarters of an inch bearing in openings $g$ in the core, and within and upon which the joint-pins work, thus giving a solid bearing the full length of the joint-pins $f$, the latter of course being passed into their bearings $g$ before being riveted to the yoke-flanges. The core $d$ has top and end shoulders $h$ and $i$, with which the ends $j$ of the yoke and their under surfaces match and abut to control the flexure of the yoke-sections $a$, in order that the pads may be self-adjusting to the horse's back by opening and closing to conform thereto and to limit such movement, as the shoulders $h$ prevent the too-far opening of the yoke and the extensions $i$ form bearing-stops to limit the closing of the yoke, the latter stops being extensions of and outside the pin-bearings of the core, and thus act directly upon the concave sides of the yoke as the latter are brought together. To make a neat fit the yoke-flanges are fitted in recesses $l$ in the sides of the core, and the top and side central portions of the core are flush with the outer sides of the yoke. The cap $m$ covers the top and sides of the joints and has the loop $n$ for the back-strap. It is not intended to touch the arms of the yoke at any point, but rests wholly upon the central portion $p$ of the fixed core, to which it is clamped and securely held by a screw-shank, $q$, of the check-hook $r$, passing through the center of the cap and the core, and secured by a nut, $s$, in a recess on the under side of the core.

I claim—

1. A separate fixed core-bearing for the joints in combination with a center-hinged self-adjusting harness saddle-tree, essentially as described.

2. The separate core $d$ and the independent cap $m$, secured together by means of the check-hook $r$ to cover the united joints of the tree, essentially as described.

3. In a center-jointed self-adjusting harness saddle-tree, a fixed core-joint bearing, $d$, constructed to form stops to the joints, essentially as described.

MARTIN W. POND.

Witnesses:
J. H. FAXON,
T. S. FAXON.